US011674006B2

(12) United States Patent
Schweiger et al.

(10) Patent No.: US 11,674,006 B2
(45) Date of Patent: Jun. 13, 2023

(54) MINERAL WOOL INSULATION

(71) Applicant: Owens Corning Intellectual Capital, LLC, Toledo, OH (US)

(72) Inventors: Scott W. Schweiger, Newark, OH (US); Christopher A. Stoneburg, Columbus, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 900 days.

(21) Appl. No.: 16/574,199

(22) Filed: Sep. 18, 2019

(65) Prior Publication Data

US 2020/0087472 A1 Mar. 19, 2020

Related U.S. Application Data

(60) Provisional application No. 62/733,126, filed on Sep. 19, 2018.

(51) Int. Cl.

| | |
|---|---|
| ***C08J 5/04*** | (2006.01) |
| ***C03C 25/285*** | (2018.01) |
| ***C03C 25/40*** | (2006.01) |
| ***C03C 25/30*** | (2018.01) |
| ***C03C 13/06*** | (2006.01) |
| ***G10K 11/162*** | (2006.01) |
| ***F16L 59/14*** | (2006.01) |
| ***C03C 25/255*** | (2018.01) |
| ***E04B 1/88*** | (2006.01) |

(52) U.S. Cl.

CPC ............... *C08J 5/043* (2013.01); *C03C 13/06* (2013.01); *C03C 25/255* (2018.01); *C03C 25/285* (2013.01); *C03C 25/30* (2013.01); *C03C 25/40* (2013.01); *F16L 59/14* (2013.01); *G10K 11/162* (2013.01); *C08J 2323/08* (2013.01); *C08J 2333/02* (2013.01); *C08J 2383/04* (2013.01); *C08J 2391/06* (2013.01); *C08J 2423/08* (2013.01); *C08J 2433/02* (2013.01); *C08J 2483/04* (2013.01); *C08J 2491/06* (2013.01); *E04B 1/88* (2013.01)

(58) Field of Classification Search

CPC .......... E04B 1/88; F16L 59/14; C03C 25/225; C03C 25/285; C03C 25/30; C03C 25/40; C03C 13/06; C08J 5/043; C08J 2233/02; C08J 2323/08; C08J 2363/04; C08J 2391/06; C08J 2423/04; C08J 2423/08; C08J 2433/02; C08J 2491/06

See application file for complete search history.

(56) References Cited

U.S. PATENT DOCUMENTS

| | | | | |
|---|---|---|---|---|
| 2,107,284 A | 2/1938 | Bone et al. | | |
| 2,714,276 A | 8/1955 | Landes | | |
| 3,379,608 A * | 4/1968 | Wendt | D21J 1/00 | 162/187 |
| 3,472,682 A | 10/1969 | Rammel et al. | | |
| 3,928,666 A | 1/1975 | Morrison et al. | | |
| 6,429,240 B1 | 8/2002 | Michelman et al. | | |
| 6,809,046 B2 | 10/2004 | Velpari et al. | | |
| 6,878,800 B2 | 4/2005 | Husemoen et al. | | |
| 7,148,271 B2 | 12/2006 | Michelman et al. | | |
| 7,553,780 B2 | 6/2009 | Smith | | |
| 7,718,249 B2 | 5/2010 | Russell et al. | | |
| 7,811,413 B2 | 10/2010 | Hennis et al. | | |
| 8,003,214 B2 | 8/2011 | Rediger et al. | | |
| 8,044,129 B2 | 10/2011 | Inoue et al. | | |
| 8,215,083 B2 | 7/2012 | Toas et al. | | |
| 8,568,544 B2 | 10/2013 | Engbrecht et al. | | |
| 8,697,618 B2 | 4/2014 | Bodesheim et al. | | |
| 8,940,089 B2 | 1/2015 | Hampson et al. | | |
| 8,968,870 B2 * | 3/2015 | Sinnige | B05D 7/00 | 427/389.9 |
| 9,469,747 B2 | 10/2016 | Hampson et al. | | |
| 2006/0188672 A1 | 8/2006 | Brower | | |
| 2009/0311936 A1 | 12/2009 | Espiard et al. | | |
| 2010/0279573 A1 * | 11/2010 | Sinnige | C09K 3/22 | 524/313 |
| 2011/0024433 A1 | 2/2011 | Rolland et al. | | |
| 2012/0196081 A1 | 8/2012 | Gleich et al. | | |
| 2013/0327250 A1 | 12/2013 | Shooshtari | | |
| 2014/0323617 A1 | 10/2014 | De Keukeleire et al. | | |
| 2014/0342627 A1 | 11/2014 | Alavi | | |
| 2014/0352988 A1 | 12/2014 | Aldino et al. | | |
| 2015/0010730 A1 | 1/2015 | Faynot et al. | | |
| 2015/0119507 A1 | 4/2015 | Shooshtari | | |
| 2016/0281295 A1 | 9/2016 | Van Leeuwen et al. | | |

(Continued)

FOREIGN PATENT DOCUMENTS

| | | |
|---|---|---|
| CN | 1377919 A | 11/2002 |
| CN | 102826817 A | 12/2012 |

(Continued)

OTHER PUBLICATIONS

Extended European Search Report from EP Application No. 19863798.5 dated May 10, 2022.

Office Action from CN Application No. 201980061033.8 dated Aug. 15, 2022.

International Search Report and Written Opinion from PCT/US19/51633 dated Dec. 4, 2019.

Marc Hirsch, "Surface Active Agents (Surfactants): Types and Applications," Sep. 25, 2015, https://knowledge.ulprospector.com/3106/pc-surface-active-agents-surfactants/.

Office Action from CN Application No. 201980061033.8 dated Feb. 26, 2023.

*Primary Examiner* — C Melissa Koslow

(74) *Attorney, Agent, or Firm* — Calfee, Halter & Griswold LLP

(57) ABSTRACT

Mineral wool insulation products are provided. The mineral wool insulation includes a plurality of mineral wool fibers and a wax emulsion applied to the mineral wool fibers. The wax emulsion imparts excellent water resistance and thermal performance properties to the mineral wool insulation.

17 Claims, 3 Drawing Sheets

(56) References Cited

U.S. PATENT DOCUMENTS

| | | | |
|---|---|---|---|
| 2017/0210945 | A1 | 7/2017 | Hampson et al. |
| 2017/0341268 | A1 | 11/2017 | Soliman et al. |

FOREIGN PATENT DOCUMENTS

| | | | |
|---|---|---|---|
| DE | 202014103848 | U1 | 12/2014 |
| WO | 9426404 | A1 | 11/1994 |
| WO | 2000078194 | A1 | 12/2000 |
| WO | 2004058465 | A1 | 7/2004 |
| WO | 2009080281 | A1 | 7/2009 |
| WO | 2010054467 | A1 | 5/2010 |
| WO | 2011041083 | A1 | 4/2011 |

* cited by examiner

MINERAL WOOL INSULATION

CROSS-REFERENCE TO RELATED APPLICATIONS

This application claims priority to and the benefit of U.S. Provisional Application No. 62/733,126, filed Sep. 19, 2018, the entire content of which is incorporated by reference herein.

FIELD

The general inventive concepts relate to mineral wool products and, more particularly, to mineral wool insulation having excellent water resistance and thermal performance properties.

BACKGROUND

Mineral wool products are well known and have been used extensively in the building industry for insulation (both thermal and acoustic) and fire protection. The mineral wool products are commonly provided in the form of batts or boards.

A general process of making mineral wool products includes preparing a molten mineral melt, fiberizing the mineral melt via internal or external centrifugation to form a plurality of mineral wool fibers, attenuating the mineral wool fibers with a gas stream, and collecting the mineral wool fibers in the form of a web. A binder or sizing composition is typically applied to the mineral wool fibers when entrained in the gas stream, or onto the web. The web of fibers may be consolidated by cross-lapping or other consolidation methods and cured, such as by passing the consolidated web of fibers through a curing oven. The cured web may be cut into products of desired sizes and dimensions.

Binders used to form the mineral wool products are generally aqueous solutions that include a thermosetting resin and additives such as crosslinking catalysts, adhesion-promoters, dedusting oils, and so forth. In some instances, the binder may include a water repelling agent, such as a silicone (e.g., a polysiloxane). Alternatively, a water repelling agent may be applied to the mineral wool fibers or web separately from the binder.

While silicones are satisfactory water repelling agents for mineral wool products, using silicone-based water repelling agents has drawbacks. For example, during the production of the mineral wool product, a portion of the silicone volatilizes and becomes entrained in the process exhaust stream. When the process exhaust stream reaches the regenerative thermal oxidizers, the silicone decomposes and leaves an amorphous silica residue on the regenerative thermal oxidizer media. Over time the buildup of amorphous silica residue fouls the media, which leads to increased back pressure that dislodges and damages the media. Repairing and/or replacing the regenerative thermal oxidizer media is expensive and also results in process downtime.

SUMMARY

The general inventive concepts relate to mineral wool insulation having excellent water resistance and thermal performance properties. To illustrate various aspects of the general inventive concepts, several exemplary embodiments of mineral wool insulation are disclosed.

In one exemplary embodiment, a mineral wool insulation is provided. The mineral wool insulation includes a plurality of mineral wool fibers. A binder and a wax emulsion are applied to the mineral wool fibers. A water absorption of the mineral wool insulation is less than 1% by volume based on the volume of the mineral wool insulation, as tested according to ASTM C209.

In one exemplary embodiment, a mineral wool insulation is provided. The mineral wool insulation includes a plurality of mineral wool fibers. A binder and a wax emulsion are applied to the mineral wool fibers. A thermal performance, in terms of R-value per inch of thickness, of the mineral wool insulation is unchanged or decreased by less than 10% immediately after a water absorption test conducted in accordance with ASTM C209.

In one exemplary embodiment, a mineral wool insulation is provided. The mineral wool insulation includes a plurality of mineral wool fibers. A binder, a wax emulsion, and a dedusting oil are applied to the mineral wool fibers. A water absorption of the mineral wool insulation is less than 2.5% by volume based on the volume of the mineral wool insulation, as tested according to ASTM C209.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
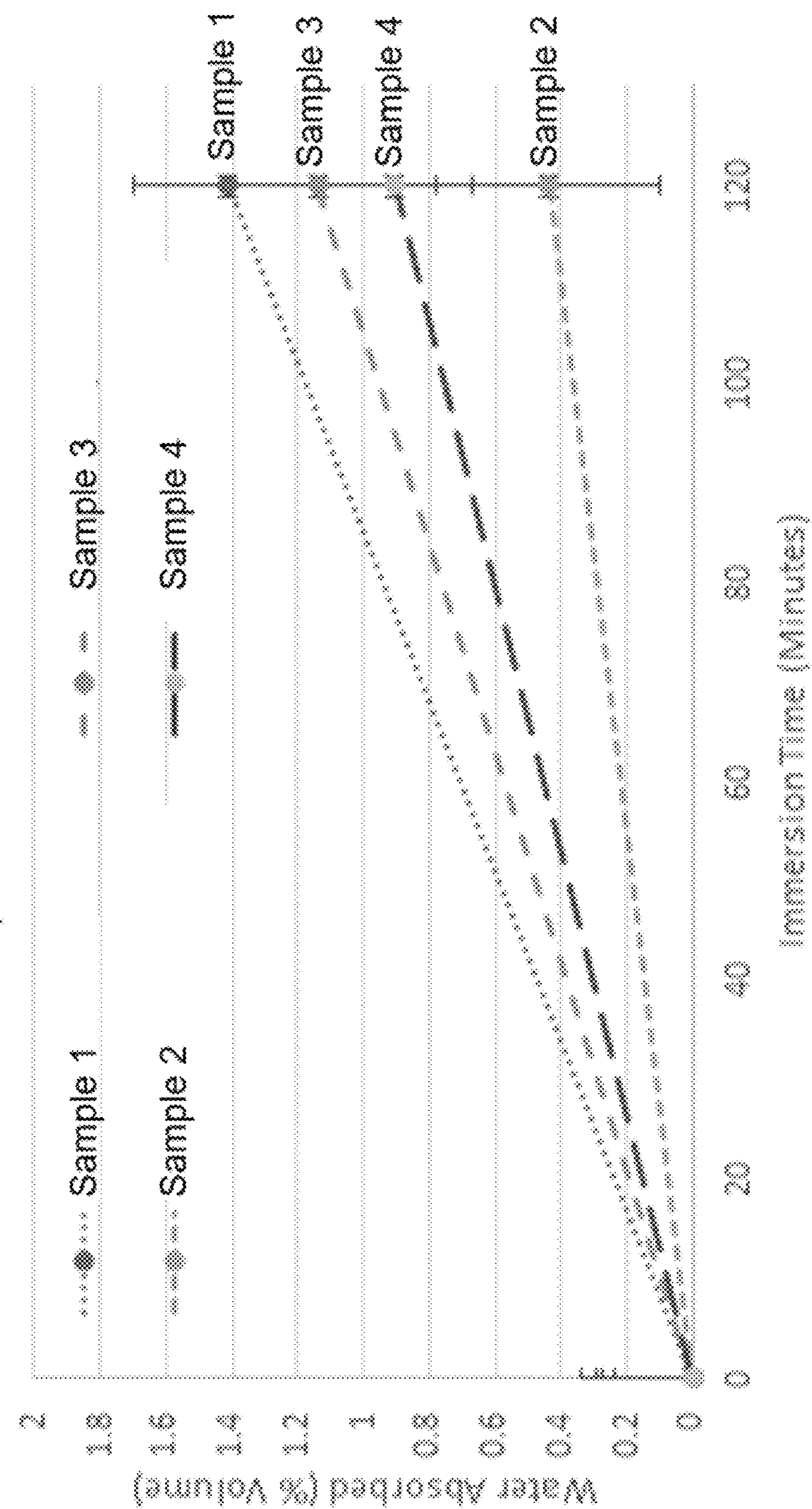
FIG. 1 is a graph showing water absorption in accordance with ASTM C209 of samples of mineral wool insulation.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

The general inventive concepts are based, at least in part, on the discovery that replacing a silicone-based water repelling agent used in a mineral wool insulation product with a wax emulsion solves the problem associated with fouling of regenerative thermal oxidizer media caused by the silicone-based water repelling agent. In addition, it was surprisingly discovered that replacing a silicone-based water repelling agent used in a mineral wool insulation product with a wax emulsion or a wax emulsion and a dedusting oil results in a mineral wool insulation product that has unexpectedly improved water resistance and thermal performance properties.

The exemplary mineral wool insulation products described herein may be produced in accordance with conventional manufacturing processes known to those of ordinary skill in the art. In general, a process of making a mineral wool insulation product includes a step of preparing a molten mineral melt. The molten mineral melt may comprise a variety of materials including, but not limited to, slags, various rocks, glass, and combinations thereof. These materials are melted in a furnace, such as a cupola, to produce the molten mineral melt.

Next, the molten mineral melt is fiberized using well known internal or external centrifugation techniques to form a plurality of mineral wool fibers. The plurality of mineral wool fibers may then be attenuated, for example, by a heated gas stream. The attenuated mineral wool fibers are deposited or otherwise collected in the form of a web. A binder composition may be applied to the mineral wool fibers when entrained in the heated gas stream, or may be applied onto the web. The web of fibers is consolidated by cross-lapping or another consolidation method and cured by passing the consolidated web of mineral wool fibers through a curing oven. The cured web of mineral wool fibers may be cut into products of desired sizes and dimensions.

In one exemplary embodiment, a mineral wool insulation is provided. The mineral wool insulation includes a plurality of mineral wool fibers and a wax emulsion applied to the mineral wool fibers. The plurality of mineral wool fibers is generally adhered together with a binder composition to form the mineral wool insulation. In certain exemplary embodiments, a water absorption of the mineral wool insulation is less than 1% by volume based on the volume of the mineral wool insulation, as tested according to ASTM C209. In certain exemplary embodiments, a thermal performance, in terms of R-value per inch of thickness, of the mineral wool insulation is unchanged or decreased by less than 10% immediately after a water absorption test conducted in accordance with ASTM C209.

In one exemplary embodiment, a mineral wool insulation is provided. The mineral wool insulation includes a plurality of mineral wool fibers, a wax emulsion, and a dedusting oil applied to the mineral wool fibers. The plurality of mineral wool fibers is generally adhered together with a binder composition to form the mineral wool insulation. The combination of the wax emulsion and the dedusting oil impart a water absorption to the mineral wool insulation that is less than 2.5% by volume based on the volume of the mineral wool insulation, as tested according to ASTM C209.

In certain embodiments, the mineral wool fibers comprise one or more of basalt, bauxite, dolomite, peridotite, diabase, gabbro, limestone, nepheline syenite, silica sand, granite, clay, feldspar, phosphate-smelter slag, copper slag, and blast furnace slag. In certain embodiments, the mineral wool fibers comprise at least 90% by weight of the total weight of the mineral wool insulation. In certain embodiments, the mineral wool fibers comprise 90% to 99% by weight of the total weight of the mineral wool insulation. In certain embodiments, the mineral wool fibers comprise 90% to 97% by weight of the total weight of the mineral wool insulation. In certain embodiments, the mineral wool fibers comprise 90% to 95% by weight of the total weight of the mineral wool insulation.

In certain embodiments, the wax emulsion applied to the mineral wool fibers may be any wax emulsion that imparts the mineral wool insulation with a water absorption of less than 1% by volume based on the volume of the mineral wool insulation, as tested according to ASTM C209. In certain embodiments, the wax emulsion applied to the mineral wool fibers comprises at least one of an anionic polyethylene/paraffin wax emulsion and an anionic paraffin/hydrocarbon wax emulsion. One example of a wax emulsion that achieves such a water absorption is Michem® Lube 693 wax emulsion, which is commercially available from Michelman, Inc. (Cincinnati, Ohio). The Michem® Lube 693 wax emulsion is an anionic polyethylene/paraffin wax emulsion with a solids content of 38.5% to 39.5% and a pH of 9 to 10. Another example of a wax emulsion that achieves such a water absorption is HydroCer DP-336 wax emulsion, which is commercially available from Shamrock Technologies, Inc. (Newark, N.J.). The HydroCer DP-336 wax emulsion is an anionic paraffin/hydrocarbon wax emulsion with a solids content of 33% to 39% and a pH of 10 to 11.

In certain embodiments, the wax emulsion applied to the mineral wool fibers imparts the mineral wool insulation with a water absorption of less than 0.8% by volume based on the volume of the mineral wool insulation, as tested according to ASTM C209. In certain embodiments, the wax emulsion applied to the mineral wool fibers imparts the mineral wool insulation with a water absorption of 0.4% to 0.6% by volume based on the volume of the mineral wool insulation, as tested according to ASTM C209. One example of a wax emulsion that can impart the mineral wool insulation with a water absorption of less than 0.8% by volume based on the volume of the mineral wool insulation, including a water absorption of 0.4% to 0.6% by volume based on the volume of the mineral wool insulation, as tested according to ASTM C209, is the Michem® Lube 693 wax emulsion.

In certain embodiments, the wax emulsion applied to the mineral wool fibers may be any wax emulsion that imparts the mineral wool insulation with a thermal performance, in terms of R-value per inch of thickness, that is unchanged or is decreased by less than 10% immediately after a water absorption test conducted in accordance with ASTM C209. One example of a wax emulsion that achieves such a thermal performance is the Michem® Lube 693 wax emulsion. The thermal performance of the mineral wool insulation may be tested with a FOX series thermal conductivity meter, available from TA Instruments, Inc. (New Castle, Del.). In certain embodiments, the mineral wool insulation in a dry condition has an R-value per inch of thickness of 4 to 4.5, and the mineral wool insulation immediately after a water absorption test conducted in accordance with ASTM C209 has an R-value per inch of thickness of 3.6 to 4.3.

As mentioned above, a combination of a wax emulsion and a dedusting oil can be used to achieve a hydrophobic mineral wool insulation that resists water absorption. In certain embodiments, the wax emulsion and the dedusting oil applied to the mineral wool fibers may be any combination of wax emulsion and dedusting oil that imparts the mineral wool insulation with a water absorption of less than 2.5% by volume based on the volume of the mineral wool insulation, as tested according to ASTM C209. In certain embodiments, the wax emulsion applied to the mineral wool fibers comprises at least one of an anionic polyethylene/paraffin wax emulsion and an anionic paraffin/hydrocarbon wax emulsion, and the dedusting oil applied to the mineral wool fibers comprises at least one of mineral oil and a mixture of water, petrolatum, and emulsifiers. One example of a wax emulsion and dedusting oil combination that achieves such a water absorption is Michem® Lube 693 wax emulsion, described above, and CrystalCer™ 90 dedusting oil, which is commercially available from PMC Crystal (Lansdale, Pa.). The CrystalCer™ 90 dedusting oil is a mixture of water, petrolatum, and emulsifiers. Another example of a wax emulsion and dedusting oil that achieves such a water absorption is Michem® Lube 693K wax emulsion, which is commercially available from Michelman, Inc. (Cincinnati, Ohio), and mineral oil.

In certain embodiments, the combined wax emulsion and dedusting oil applied to the mineral wool fibers imparts the mineral wool insulation with a water absorption of less than 2.25% by volume based on the volume of the mineral wool insulation, as tested according to ASTM C209. Examples of a wax emulsion and dedusting oil combination that achieves such a water absorption are a combination of the Michem® Lube 693 wax emulsion and the CrystalCer™ 90 dedusting oil, and a combination of the Michem® Lube 693K wax emulsion and mineral oil. In certain embodiments, the combined wax emulsion and dedusting oil applied to the mineral wool fibers imparts the mineral wool insulation with a water absorption of less than 2%, including from 1.5% to 2%, by volume based on the volume of the mineral wool insulation, as tested according to ASTM C209. One example of a wax emulsion and dedusting oil combination that can impart the mineral wool insulation with a water absorption of less 2%, including from 1.5% to 2%, from 1.8% to 2%, and also including from 1.85% to 2% by volume based on the volume of the mineral wool insulation, as tested according to ASTM C209, is the Michem® Lube 693 wax emulsion and the CrystalCer™ 90 dedusting oil.

The wax emulsion may be applied to the plurality of mineral wool fibers in accordance with any conventional means known to those of skill in the art. In certain embodiments, the wax emulsion is applied to the mineral wool fibers by spraying. For example, in certain embodiments, the wax emulsion is sprayed onto the mineral wool fibers while the mineral wool fibers are entrained in the heated gas stream used to attenuate the mineral wool fibers. In certain other embodiments, the wax emulsion is sprayed onto the mineral wool fibers after the mineral wool fibers are collected as a web.

In certain embodiments, the wax emulsion is applied to the plurality of mineral wool fibers simultaneously with the binder composition. For example, the wax emulsion may be mixed with the binder composition, and the combined wax emulsion and binder composition is applied to the mineral wool fibers. In certain embodiments, the binder composition comprises the wax emulsion as a component of the binder composition.

The dedusting oil may be applied to the plurality of mineral wool fibers in accordance with any conventional means known to those of skill in the art. In certain embodiments, the dedusting oil is applied to the mineral wool fibers by spraying. For example, in certain embodiments, the dedusting oil is sprayed onto the mineral wool fibers while the mineral wool fibers are entrained in the heated gas stream used to attenuate the mineral wool fibers. In certain other embodiments, the dedusting oil is sprayed onto the mineral wool fibers after the mineral wool fibers are collected as a web.

In certain embodiments, the dedusting oil is applied to the plurality of mineral wool fibers simultaneously with the wax emulsion. For example, the dedusting oil may be mixed with the wax emulsion, and the combined dedusting oil and wax emulsion is applied to the mineral wool fibers. In certain embodiments, the dedusting oil and the wax emulsion are applied to the plurality of mineral wool fibers simultaneously with the binder composition. For example, the dedusting oil and the wax emulsion may be mixed with the binder composition, and the combined dedusting oil, wax emulsion, and binder composition is applied to the mineral wool fibers. In certain embodiments, the binder composition comprises the wax emulsion and the dedusting oil as components of the binder composition.

A variety of binder compositions may be used in the exemplary mineral wool insulation products disclosed herein. Typically, the binder composition includes a thermosetting resin. Exemplary binder compositions include, but are not limited to, carbohydrate-based binders, phenol-formaldehyde binders, urea-formaldehyde binders, melamine binders, and acrylic binders. In certain embodiments, the binder composition is a carbohydrate-based binder and is substantially free of formaldehyde. In certain embodiments, the binder composition is a phenol-formaldehyde binder.

In certain embodiments, the binder and the wax emulsion comprise 1% to 10% by weight of the total weight of the mineral wool insulation. In certain embodiments, the binder and the wax emulsion comprise 3% to 10% by weight of the total weight of the mineral wool insulation. In certain embodiments, the binder and the wax emulsion comprise 5% to 10% by weight of the total weight of the mineral wool insulation.

In certain embodiments, the wax emulsion comprises 0.001% to 0.4% by weight of the total weight of the mineral wool insulation. In certain embodiments, the wax emulsion comprises 0.005% to 0.3% by weight of the total weight of the mineral wool insulation. In certain embodiments, the wax emulsion comprises 0.1% to 0.2% by weight of the total weight of the mineral wool insulation.

In embodiments containing a dedusting oil, the binder, the wax emulsion, and the dedusting oil comprise 1% to 10% by weight of the total weight of the mineral wool insulation. In certain embodiments, the binder, the wax emulsion, and the dedusting oil comprise 3% to 10% by weight of the total weight of the mineral wool insulation. In certain embodiments, the binder, the wax emulsion, and the dedusting oil comprise 5% to 10% by weight of the total weight of the mineral wool insulation.

In certain embodiments, the dedusting oil comprises 0.0005% to 0.27% by weight of the total weight of the mineral wool insulation. In certain embodiments, the dedusting oil comprises 0.002% to 0.2% by weight of the total weight of the mineral wool insulation. In certain embodiments, the wax emulsion comprises 0.05% to 0.14% by weight of the total weight of the mineral wool insulation.

The exemplary mineral wool insulation described herein may have a density of 2 $lb/ft^3$ to 10 $lb/ft^3$. In certain embodiments, the mineral wool insulation has a density of 3 $lb/ft^3$ to 9 $lb/ft^3$, including from 3.5 $lb/ft^3$ to 8.5 $lb/ft^3$, from 3.5 $lb/ft^3$ to 8 $lb/ft^3$, from 4 $lb/ft^3$ to 8 $lb/ft^3$, and also including from 4 $lb/ft^3$ to 6 $lb/ft^3$.

In certain embodiments, the mineral wool insulation includes at least one facing material on a surface thereof. In certain embodiments, the at least one facing material comprises a foil scrim kraft facing. In certain embodiments, the at least one facing material comprises an all service jacket facing. In certain embodiments, the at least one facing material comprises a foil scrim polyethylene facing. In certain embodiments, the at least one facing material comprises a nonwoven glass fiber mat. In certain embodiments, the at least one facing material comprises a nonwoven polyester fiber mat. In certain embodiments, the at least one facing material comprises a polypropylene scrim kraft facing.

In certain embodiments, the mineral wool insulation is in the form of a batt. In certain embodiments, the batt includes at least one facing material on a surface of the batt. The facing material on a surface of the batt may be any one or more of the facing materials previously described.

In certain embodiments, the mineral wool insulation is in the form of a board. In certain embodiments, the board includes at least one facing material on a surface of the board. The facing material on a surface of the board may be any one or more of the facing materials previously described.

The exemplary mineral wool insulation described herein may be used to provide thermal insulation, acoustic insulation, and/or fire protection to residential and commercial buildings. In certain embodiments, the mineral wool insulation is suitable for use as a safing insulation and has a melting point of at least 1,093° C. (2,000° F.). In certain embodiments, the mineral wool insulation is suitable for use as a curtain wall insulation in a perimeter fire containment system. In certain embodiments, the mineral wool insulation is suitable for use as a pipe insulation.

EXAMPLES

Example 1

Mineral wool insulation samples were produced using different water repelling agents, and were tested for water absorbance in accordance with ASTM C209. Mineral wool insulation Sample 1 was produced using Xiameter™ 347G, a silicone-based emulsion, available from Dow Corning, Inc. (Midland, Mich.). Mineral wool insulation Sample 2 was produced using Michem® Lube 693 wax emulsion, available from Michelman, Inc. (Cincinnati, Ohio). Mineral wool insulation Sample 3 was produced using Michem® Prime 4983R, an ethylene-acrylic acid copolymer dispersion, available from Michelman, Inc. (Cincinnati, Ohio). Mineral wool insulation Sample 4 was produced using HydroCer DP-336 wax emulsion, available from Shamrock Technologies, Inc. (Newark, N.J.).

In accordance with ASTM C209, three 12 inch by 12 inch specimens were obtained from three boards for each of Sample 1, Sample 2, Sample 3, and Sample 4. Each specimen was conditioned at a temperature of 23° C.±2° C. (73.4° F.±4° F.) and a relative humidity of 50%±5% until a constant weight was obtained. The thickness of each specimen was measured and the volume of each sample was calculated. Each specimen was then weighed and subsequently submerged under 25 mm (1 inch) of fresh tap water, maintained at a temperature of 23° C.±2° C. (73.4° F.±4° F.). After 2 hours of submersion, each specimen was placed on end to drain for 10 minutes. At the end of the 10 minute drain period, excess surface water was removed by hand with a blotting paper or paper towel. Each specimen was then weighed. The volume of water absorbed by each specimen was calculated based on the increase in weight due to the submersion, and expressed as the percentage by volume based on the volume after conditioning, with the assumption that the specific gravity of the water is 1.00 for calculation purposes.

As seen in FIG. 1, Samples 1 and 3 both had a water absorption of 1.41% and 1.14% by volume, respectively, based on the total volume of the respective sample. On the other hand, Samples 2 and 4 both had a water absorption of less than 1% by volume based on the total volume of the respective sample. Sample 4 had a water absorption of about 0.91% by volume based on the total volume of the sample. Sample 2 had the lowest water absorption of all the samples tested, with a water absorption of about 0.44% by volume based on the total volume of the sample.

Example 2

Mineral wool insulation samples were produced using different water repelling agents, and were tested for thermal performance using a FOX 600 series heat flow meter from TA Instruments, Inc. (New Castle, Del.), as well as for water absorbance in accordance with ASTM C209. Mineral wool insulation Sample 1 was produced using Xiameter™ 347G, a silicone-based emulsion, available from Dow Corning, Inc. (Midland, Mich.). Mineral wool insulation Sample 2 was produced using Michem® Lube 693 wax emulsion, available from Michelman, Inc. (Cincinnati, Ohio).

Figure 2:
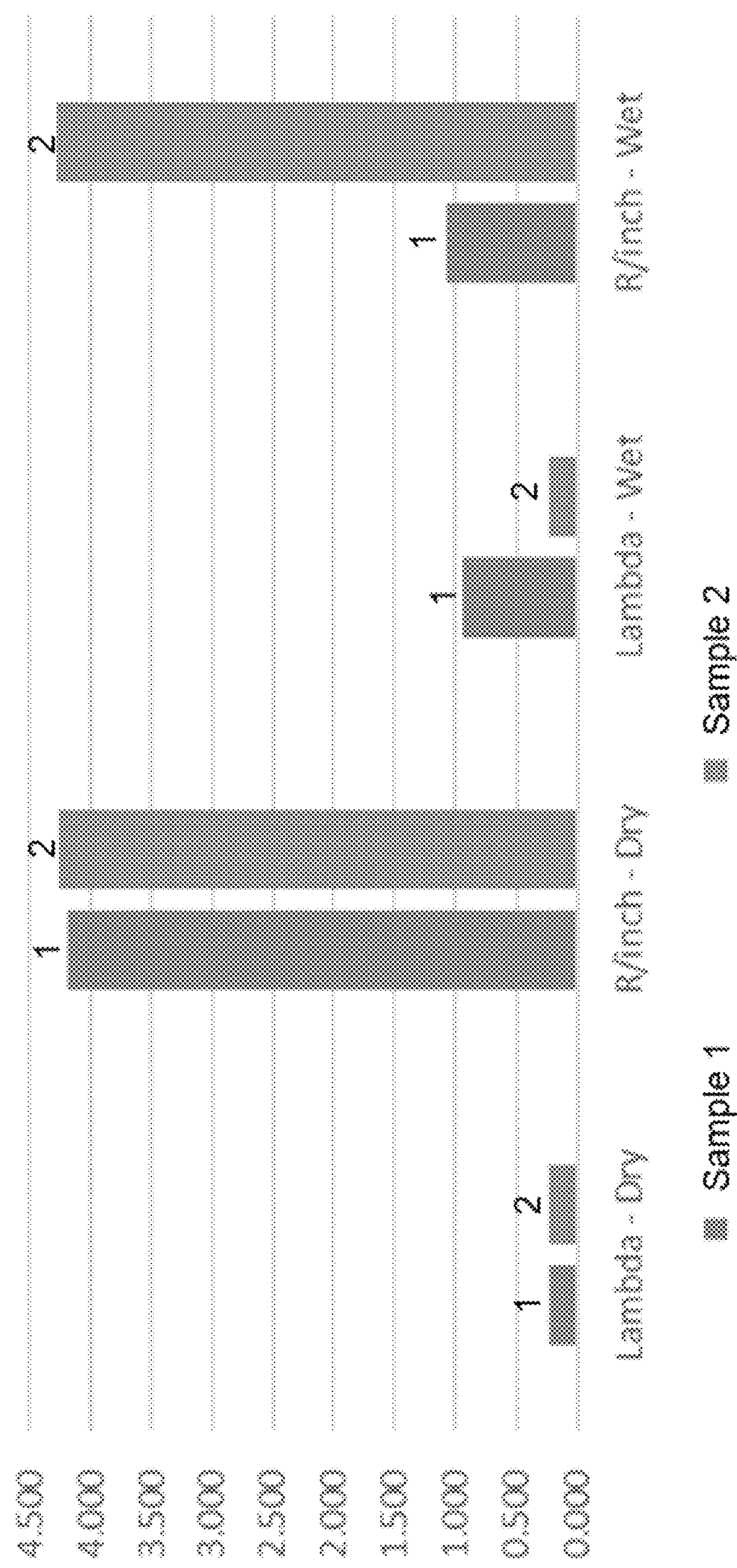
FIG. 2 is a bar graph showing the thermal performance of samples of mineral wool insulation in a dry condition and a wet condition after testing in accordance with ASTM C209.

As seen in FIG. 2, the thermal conductivity (i.e., lambda) and the R-value per inch for Sample 1 and Sample 2 in a dry condition were very similar at about 0.239 BTU·in/hr·ft$^2$·° F. (Sample 1) and about 0.234 BTU·in/hr·ft$^2$·° F. (Sample 2), and about 4.2 (Sample 1) and about 4.3 (Sample 2). However, after a two-hour soak and 10 minute drain in accordance with ASTM C209, it was unexpectedly discovered that the thermal conductivity and the R-value per inch for Sample 2 were relatively unchanged at about 0.23 BTU·in/hr·ft$^2$·° F. and about 4.3, respectively. On the other hand, the thermal conductivity for Sample 1 was significantly increased to about 0.964 BTU·in/hr·ft$^2$·° F. and the R-value per inch for Sample 1 was significantly decreased to about 1.0.

Such results demonstrate that the thermal performance of the mineral wool insulation having the wax emulsion water repelling agent (i.e., Sample 2) is maintained under wet conditions, whereas the thermal performance of the mineral wool insulation having the silicone-based water repelling agent (i.e., Sample 1) is significantly degraded under wet conditions.

Samples of mineral wool insulation Sample 1 and mineral wool insulation Sample 2 were also tested for water absorbance in terms of mass increase following a two hour soak and a 10 minute drain. Three distinct samples of mineral wool insulation Sample 1 (Sample 1a, Sample 1b, and Sample 1c), and three distinct samples of mineral wool insulation Sample 2 (Sample 2a, Sample 2b, and Sample 2c) were tested. The results are shown in Table 1.

TABLE 1

Water absorbance in terms of mass increase for mineral wool insulation

| Sample No. | Thickness (10" × 10") | 95% Thickness (10" × 10") | Dry Weight | Weight After Drain | Increase in Weight |
|---|---|---|---|---|---|
| Sample 1a | 3.00" | 2.85" | 311 g | 376 g | 20.9% |
| Sample 1b | 3.00" | 2.85" | 275 g | 417 g | 51.7% |
| Sample 1c | 2.94" | 2.79" | 285 g | 366 g | 28.5% |
| Sample 2a | 2.94" | 2.79" | 371 g | 383 g | 3.3% |
| Sample 2b | 2.88" | 2.73" | 341 g | 346 g | 1.5% |
| Sample 2c | 2.88" | 2.73" | 347 g | 356 g | 2.7% |

As seen in Table 1, the weight of the mineral wool insulation of Samples 1a, 1b, and 1c increased by 20.9% to 51.7%, whereas the weight of the mineral wool insulation of Samples 2a, 2b, and 2c increased by only 1.5% to 3.3%. Accordingly, the mineral wool insulation of Samples 2a, 2b, and 2c was more hydrophobic and, thus, provided a greater barrier to water absorption than the mineral wool insulation of Samples 1a, 1b, and 1c.

Example 3

Mineral wool insulation samples were produced using different water repelling agents and dedusting oils, and were tested for water absorbance in accordance with ASTM C209. Mineral wool insulation Sample 1a was produced using Xiameter™ 347G, a silicone-based emulsion, available from Dow Corning, Inc. (Midland, Mich.), and CrystalCer™ 90 dedusting oil, available from PMC Crystal (Lansdale, Pa.). Mineral wool insulation Sample 2a was produced using Michem® Lube 693 wax emulsion, available from Michelman, Inc. (Cincinnati, Ohio), and CrystalCer™ 90 dedusting oil. Mineral wool insulation Sample 3a was produced using Michem® Lube 693K wax emulsion, available from Michelman, Inc. (Cincinnati, Ohio), and CrystalCer™ 90 dedusting oil. Mineral wool insulation Sample 4a was produced using Michem® Lube 693K wax emulsion and mineral oil. Mineral wool insulation Sample 5a was produced using Michem® Emulsion 36840K wax emulsion, available from Michelman, Inc. (Cincinnati, Ohio), and CrystalCer™ 90 dedusting oil.

Figure 3:
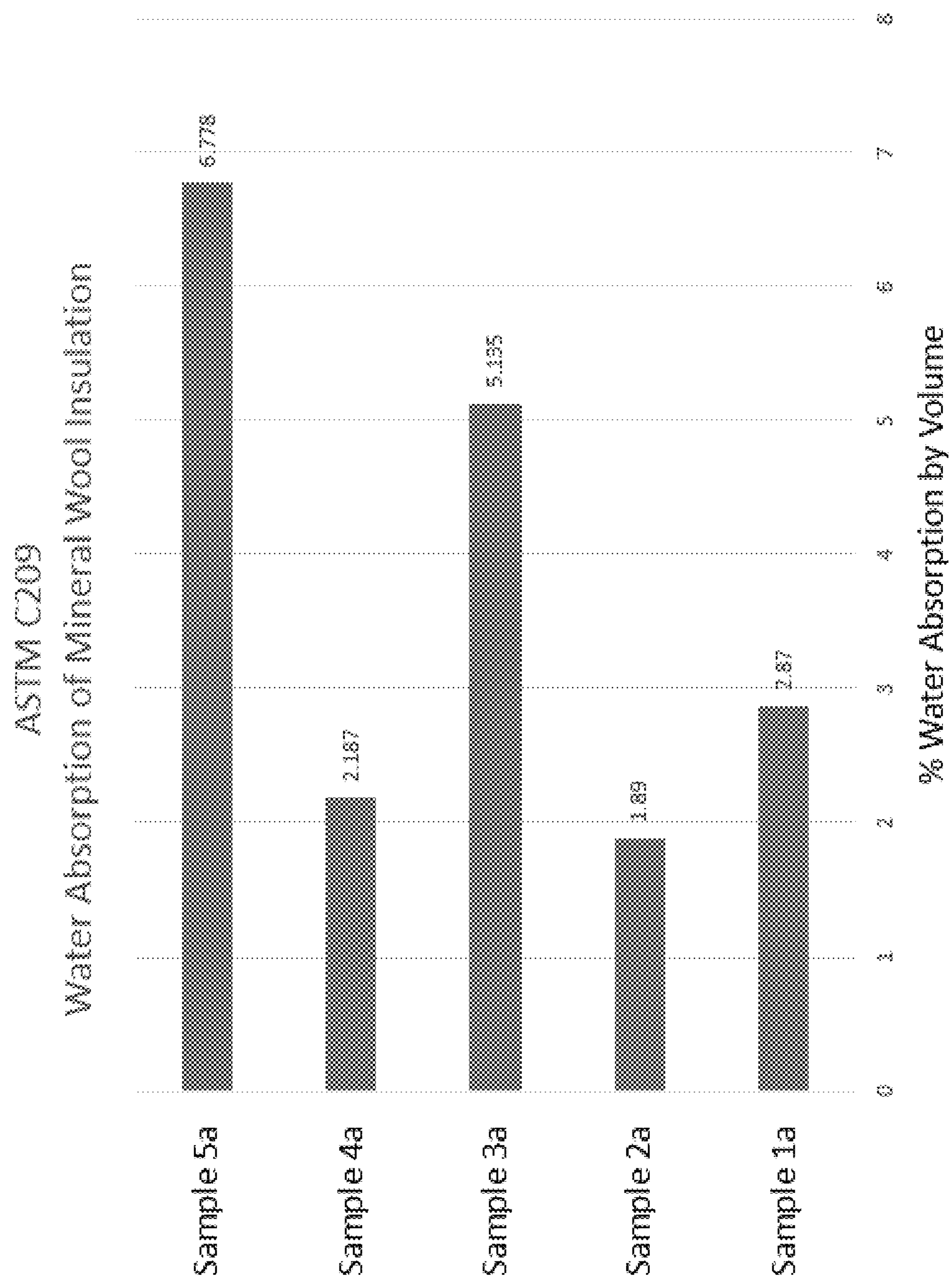
FIG. 3 is a bar graph showing water absorption in accordance with ASTM C209 of samples of mineral wool insulation.

The samples were tested for water absorbance in accordance with ASTM C209, as described above in Example 1. As seen in FIG. 3, Samples 1a, 3a, and 5a each had a water absorption of greater than 2.5% by volume based on the total volume of the respective sample. Sample 1a had a water absorption of about 2.87% by volume based on the total volume of the sample, Sample 3a had a water absorption of about 5.14% by volume based on the total volume of the sample, and Sample 5a had a water absorption of about 6.78% by volume based on the total volume of the sample. On the other hand, Samples 2a and 4a each had a water absorption of less than 2.5% by volume based on the total volume of the respective sample. Sample 4a had a water absorption of about 2.19% by volume based on the total volume of the sample. Sample 2a had the lowest water absorption of all the samples tested, with a water absorption of about 1.89% by volume based on the total volume of the sample.

As seen from the data, the water absorption of the mineral wool insulation samples produced using the Michem® Lube 693K wax emulsion (i.e., Sample 3a and Sample 4a) is affected by the dedusting oil used. The combination of Michem® Lube 693K wax emulsion and CrystalCer™ 90 dedusting oil in Sample 3a achieved a water absorption of about 5.14% by volume, whereas the combination of Michem® Lube 693K wax emulsion and mineral oil in Sample 4a achieved a water absorption of about 2.19% by volume, which represents about a 57% decrease in water absorption.

All percentages, parts, and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The mineral wool insulation and corresponding manufacturing methods of the present disclosure can comprise, consist of, or consist essentially of the essential elements and limitations of the disclosure as described herein, as well as any additional or optional ingredients, components, or limitations described herein or otherwise useful in mineral wool insulation applications.

The mineral wool insulation of the present disclosure may also be substantially free of any optional or selected essential ingredient or feature described herein, provided that the remaining composition still contains all of the required ingredients or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the Applicant intends to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices and systems disclosed. It is sought, therefore, to cover all such changes and modifications as fall within the spirit and scope of the general inventive concepts, as described and/or claimed herein, and any equivalents thereof.

What is claimed is:

1. A mineral wool insulation comprising:

a plurality of mineral wool fibers; and a binder and a wax emulsion applied to the mineral wool fibers, wherein the plurality of mineral wool fibers comprise 90% to 99% by weight of the total weight of the mineral wool insulation, and the binder and the wax emulsion comprise 1% to 10% by weight of the total weight of the mineral wool insulation, and wherein a water absorption of the mineral wool insulation is less than 1% by volume based on the volume of the mineral wool insulation, as tested according to ASTM C209.

2. The mineral wool insulation of claim 1, wherein the wax emulsion comprises 0.001% to 0.4% by weight of the total weight of the mineral wool insulation.

3. The mineral wool insulation of claim 1, wherein the binder comprises at least one of a carbohydrate-based, formaldehyde free binder, a phenol-formaldehyde binder, a urea-formaldehyde binder, a melamine binder, and an acrylic binder.

4. The mineral wool insulation of claim 1, wherein the wax emulsion comprises at least one of an anionic polyethylene/paraffin wax emulsion and an anionic paraffin/hydrocarbon wax emulsion.

5. The mineral wool insulation of claim 1, wherein the plurality of mineral wool fibers comprise at least one of basalt, bauxite, dolomite, peridotite, diabase, gabbro, limestone, nepheline syenite, silica sand, granite, clay, feldspar, phosphate-smelter slag, copper slag, and blast furnace slag.

6. The mineral wool insulation of claim 1, wherein the water absorption of the mineral wool insulation is from 0.4% to 0.8% by volume based on the volume of the mineral wool insulation, as tested according to ASTM C209.

7. The mineral wool insulation of claim 1, wherein a thermal performance, in terms of R-value per inch of thickness, of the mineral wool insulation is unchanged or decreased by less than 10% immediately after a water absorption test conducted in accordance with ASTM C209.

8. A thermal and acoustic insulation material comprising the mineral wool insulation of claim 1.

9. A safing insulation material comprising the mineral wool insulation of claim 1.

10. A curtain wall insulation material comprising:

a mineral wool insulation comprising i) a plurality of mineral wool fibers; and ii) a binder and a wax emulsion applied to the mineral wool fibers, wherein a water absorption of the mineral wool insulation is less than 1% by volume based on the volume of the mineral wool insulation, as tested according to ASTM C209.

11. A pipe insulation material comprising:

a mineral wool insulation comprising i) a plurality of mineral wool fibers; and ii) a binder and a wax emulsion applied to the mineral wool fibers, wherein a water absorption of the mineral wool insulation is less than 1% by volume based on the volume of the mineral wool insulation, as tested according to ASTM C209.

12. A mineral wool insulation comprising:

a plurality of mineral wool fibers; and a binder, a wax emulsion, and a dedusting oil applied to the mineral wool fibers, wherein plurality of mineral wool fibers comprise 90% to 99% by weight of the total weight of the mineral wool insulation, and the binder, the wax emulsion, and the dedusting oil comprise 1% to 10% by weight of the total weight of the mineral wool insulation, and wherein a water absorption of the mineral wool insulation is less than 2.5% by volume based on the volume of the mineral wool insulation, as tested according to ASTM C209.

13. The mineral wool insulation of claim 12, wherein the wax emulsion comprises 0.001% to 0.4% by weight of the total weight of the mineral wool insulation, and the dedusting oil comprises 0.0005% to 0.27% by weight of the total weight of the mineral wool insulation.

14. The mineral wool insulation of claim 12, wherein the binder comprises at least one of a carbohydrate-based, formaldehyde free binder, a phenol-formaldehyde binder, a urea-formaldehyde binder, a melamine binder, and an acrylic binder.

15. The mineral wool insulation of claim 12, wherein the wax emulsion comprises at least one of an anionic polyethylene/paraffin wax emulsion and an anionic paraffin/hydrocarbon wax emulsion, and the dedusting oil comprises at least one of mineral oil and a mixture of water, petrolatum, and emulsifiers.

16. The mineral wool insulation of claim 12, wherein the plurality of mineral wool fibers comprise at least one of basalt, bauxite, dolomite, peridotite, diabase, gabbro, limestone, nepheline syenite, silica sand, granite, clay, feldspar, phosphate-smelter slag, copper slag, and blast furnace slag.

17. The mineral wool insulation of claim 12, wherein the water absorption of the mineral wool insulation is from 1.5% to 2% by volume based on the volume of the mineral wool insulation, as tested according to ASTM C209.

* * * * *